US010887544B2

(12) United States Patent
Chen

(10) Patent No.: US 10,887,544 B2
(45) Date of Patent: Jan. 5, 2021

(54) APPARATUS AND METHOD FOR SWITCHING AND CONVERTING VIDEO SIGNALS

(71) Applicant: ACTION STAR TECHNOLOGY CO., LTD., New Taipei (TW)

(72) Inventor: Wen-Pin Chen, New Taipei (TW)

(73) Assignee: ACTION STAR TECHNOLOGY CO., LTD., New Taipei (TW)

(*) Notice: Subject to any disclaimer, the term of this patent is extended or adjusted under 35 U.S.C. 154(b) by 0 days.

(21) Appl. No.: 16/426,430

(22) Filed: May 30, 2019

(65) Prior Publication Data

US 2019/0373211 A1 Dec. 5, 2019

Related U.S. Application Data

(60) Provisional application No. 62/679,067, filed on Jun. 1, 2018.

(51) Int. Cl.
*G06F 3/14* (2006.01)
*H04N 7/01* (2006.01)

(52) U.S. Cl.
CPC .......... *H04N 7/012* (2013.01); *G06F 3/1423* (2013.01); *H04N 7/013* (2013.01); *H04N 7/0122* (2013.01)

(58) Field of Classification Search
None
See application file for complete search history.

(56) References Cited

U.S. PATENT DOCUMENTS

| 8,266,333 | B1* | 9/2012 | Wade | H04N 19/436 |
| | | | | 710/14 |
| 8,615,611 | B2* | 12/2013 | Hall | G06F 13/385 |
| | | | | 710/66 |
| 8,874,819 | B2* | 10/2014 | Chen | H01R 31/06 |
| | | | | 710/305 |
| 9,385,883 | B2* | 7/2016 | Lu | H04L 12/2838 |
| 2012/0079140 | A1* | 3/2012 | Bar-Niv | G06F 3/14 |
| | | | | 710/16 |
| 2016/0012001 | A1* | 1/2016 | Chang | G06F 13/4022 |
| | | | | 710/316 |
| 2016/0253283 | A1* | 9/2016 | Bowers | G06F 13/4068 |
| | | | | 710/305 |
| 2018/0068412 | A1* | 3/2018 | Schnell | G06F 13/4068 |
| 2018/0143916 | A1* | 5/2018 | Gupta | G06F 13/102 |
| 2018/0197501 | A1* | 7/2018 | Veeramani | G09G 5/006 |

* cited by examiner

*Primary Examiner* — Elias Mamo
(74) *Attorney, Agent, or Firm* — Anova Law Group, PLLC

(57) ABSTRACT

The present invention provides an apparatus and a method for switching and converting video signals, wherein the method majorly includes the steps of: receiving N number of DisplayPort video signals and N number of USB video signals by N number of USB Type-C connection interfaces which are in compliance with a DisplayPort Alternate Mode specification, and N is a natural number greater than or equal to 2; and selecting one out of the DisplayPort video signals and one out of the USB video signals; converting the selected DisplayPort video signal and the selected USB video signal into a DisplayPort video signal or a HDMI video signal; transmitting the converted DisplayPort video signal or HDMI video signal to Q number of display devices, and Q is a natural number greater than or equal to 2.

4 Claims, 3 Drawing Sheets

Fig. 2

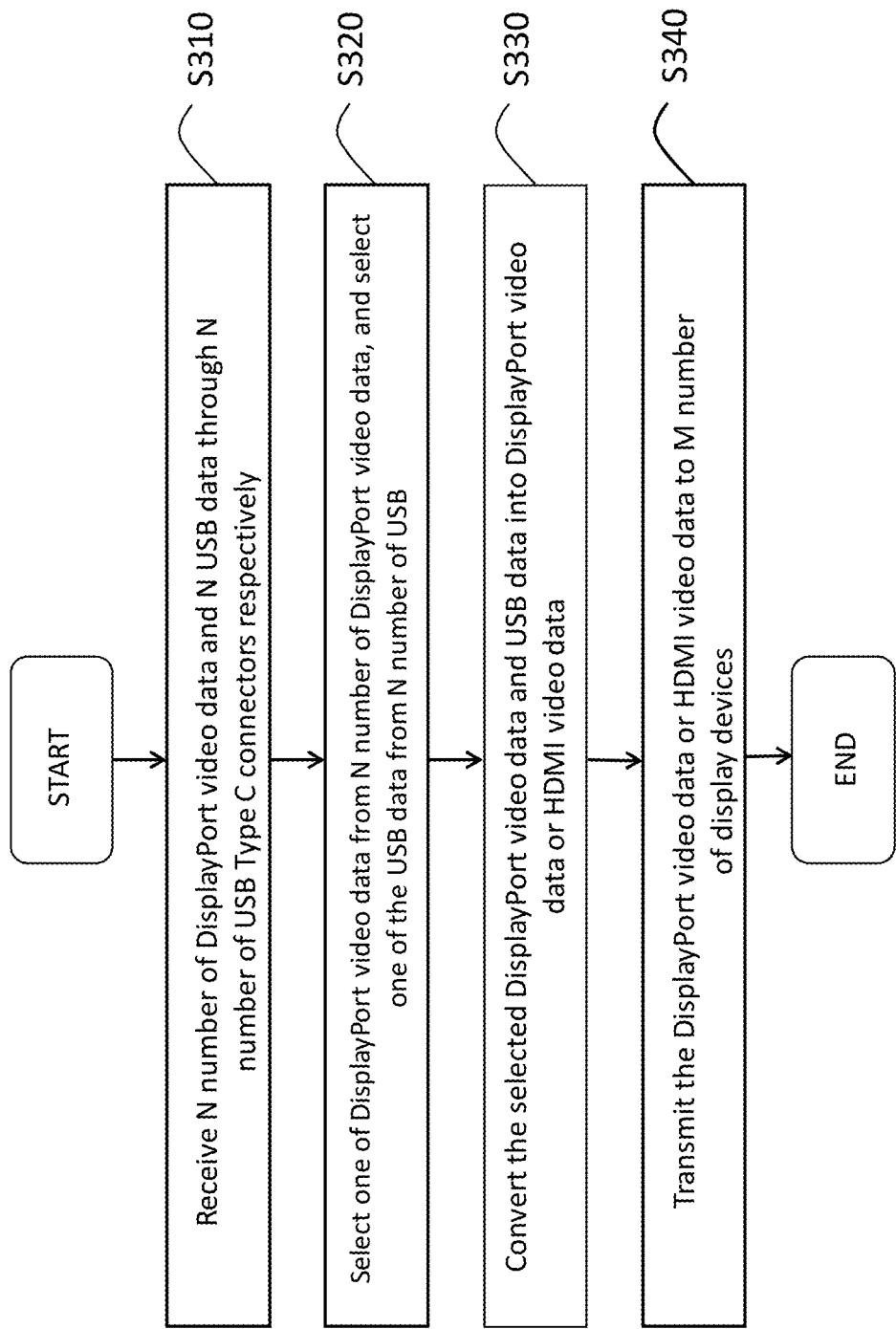

APPARATUS AND METHOD FOR SWITCHING AND CONVERTING VIDEO SIGNALS

BACKGROUND OF THE INVENTION

1. Field of the Invention

The present invention relates to an apparatus and method for transmitting video signals, and more particularly to an apparatus and method for switching and converting video signals in compliance with a USB Type-C specification and a DisplayPort Alternate Mode specification.

2. Description of the Prior Art

As technology advances, high definition image transmission specifications have replaced traditional specifications such as the VGA specification and become a mainstream of video display devices, wherein two major video transmission interface specifications including the DisplayPort and the HDMI have a relatively higher market share and the advantages of single-line transmitted video and audio signals, and large transmission bandwidth, and thus are used extensively. However, the DisplayPort specification and the HDMI specification are not compatible with each other. If the image source is of the DisplayPort specification and the display is of the HDMI specification, then an additional conversion device will be required for the signal conversion, and such application will be inconvenient.

In addition, when it is necessary to build a single image source (such as a desktop computer) for connecting several screens to create a multi-screen display environment, the equipment must be expanded to transmit video signals of a single image source to a plurality of screens for the display, but applications (including synchronous displays, teaching, games, graphic designs, store displays, restaurant billboards and stock billboards, etc.) require transmitting the displays from a plurality of image sources to a plurality of screens, particularly the requirement of selectively switching the screens of the image sources on the screens. Now, the traditional expanded devices capable of displaying a single image are no longer sufficient for the application.

Further, if it is necessary to display a plurality of screens of different specifications (such as the aforementioned incompatible DisplayPort specification and HDMI specification), the level of difficulty of creating the multi-screen display environment will become higher.

Therefore, it is an important subject for manufacturers and designers of the related industry to provide a feasible solution to selectively display screens of several image sources on a plurality of screens of various different video specifications.

SUMMARY OF THE INVENTION

To overcome the aforementioned drawbacks of the prior art, the present invention provides an apparatus for switching and converting video signals, and the apparatus comprises: N number of USB Type-C connection interfaces which are in compliance with a DisplayPort Alternate Mode specification, for receiving N number of DisplayPort video signals and N number of USB video signals from N number of video signal source devices, wherein N is a natural number greater than or equal to 2; a DisplayPort selector, electrically coupled to N number of USB Type-C connection interfaces, for selecting one out of the DisplayPort video signals; a USB selector, electrically coupled to the USB Type-C connection interfaces, for selecting one out of the USB video signals; a DisplayPort image conversion module, electrically coupled to the DisplayPort selector, for converting the selected DisplayPort video signal into a first HDMI video signal and/or not performing any conversion; a USB image conversion module, electrically coupled to the USB selector, for converting the selected USB video signal into a second HDMI video signal and/or a second DisplayPort video signal; a control unit, electrically coupled to the DisplayPort selector, the USB selector, the USB image conversion module and the DisplayPort image conversion module, for controlling the use of the DisplayPort selector and the USB selector to carry out the selection; M number of image connection interfaces, electrically coupled to the DisplayPort image conversion module, wherein the first HDMI video signal and/or the selected DisplayPort video signal are transmitted to the outside through the M number of image connection interfaces, wherein M is a natural number greater than or equal to 2; and P number of image connection interfaces, electrically coupled to the USB image conversion module, wherein the second HDMI video signal and/or the second DisplayPort video signal are transmitted to the outside through the P number of image connection interfaces, wherein P is a natural number greater than or equal to 2.

To overcome the aforementioned drawbacks of the prior art, the present invention also provides a method for switching and converting video signals, and the method comprises the steps of: receiving N number of DisplayPort video signals and N number of USB video signals by N number of USB Type-C connection interfaces in compliance with a DisplayPort Alternate Mode specification, wherein N is a natural number greater than or equal to 2; selecting one out of the DisplayPort video signals and one out of the USB video signals; converting the selected DisplayPort video signal into a first HDMI video signal and/or the non-selected DisplayPort video signal for conversion; converting the selected USB video signal into a second HDMI video signal and/or a second DisplayPort video signal; transmitting the converted first HDMI video signal and/or the selected DisplayPort video signal to M number of display devices, wherein M is a natural number greater than or equal to 2; and transmitting the converted second HDMI video signal and/or second DisplayPort video signal to P number of display devices, wherein P is a natural number greater than or equal to 2.

To overcome the aforementioned drawbacks of the prior art, the present invention further provides a method for switching and converting video signals, and the method comprises the steps of: receiving N number of DisplayPort video signals and N number of USB video signals through N number of USB Type-C connection interfaces in compliance with a DisplayPort Alternate Mode specification, wherein N is a natural number greater than or equal to 2; selecting one out of the N number of DisplayPort video signals and one out of the N number of USB video signals; converting the selected DisplayPort video signal and the selected USB video signal into a DisplayPort video signal or a HDMI video signal; transmitting the converted DisplayPort video signal or the converted HDMI video signal to Q number of display devices, wherein Q is a natural number greater than or equal to 2.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 2 is a schematic view of a display screen of a display device in accordance with a preferred embodiment of the present invention; and FIG. 3 is a flow chart of a method for switching and converting video signals in accordance with the present invention.

DETAILED DESCRIPTION OF THE PREFERRED EMBODIMENTS

Figure 1:
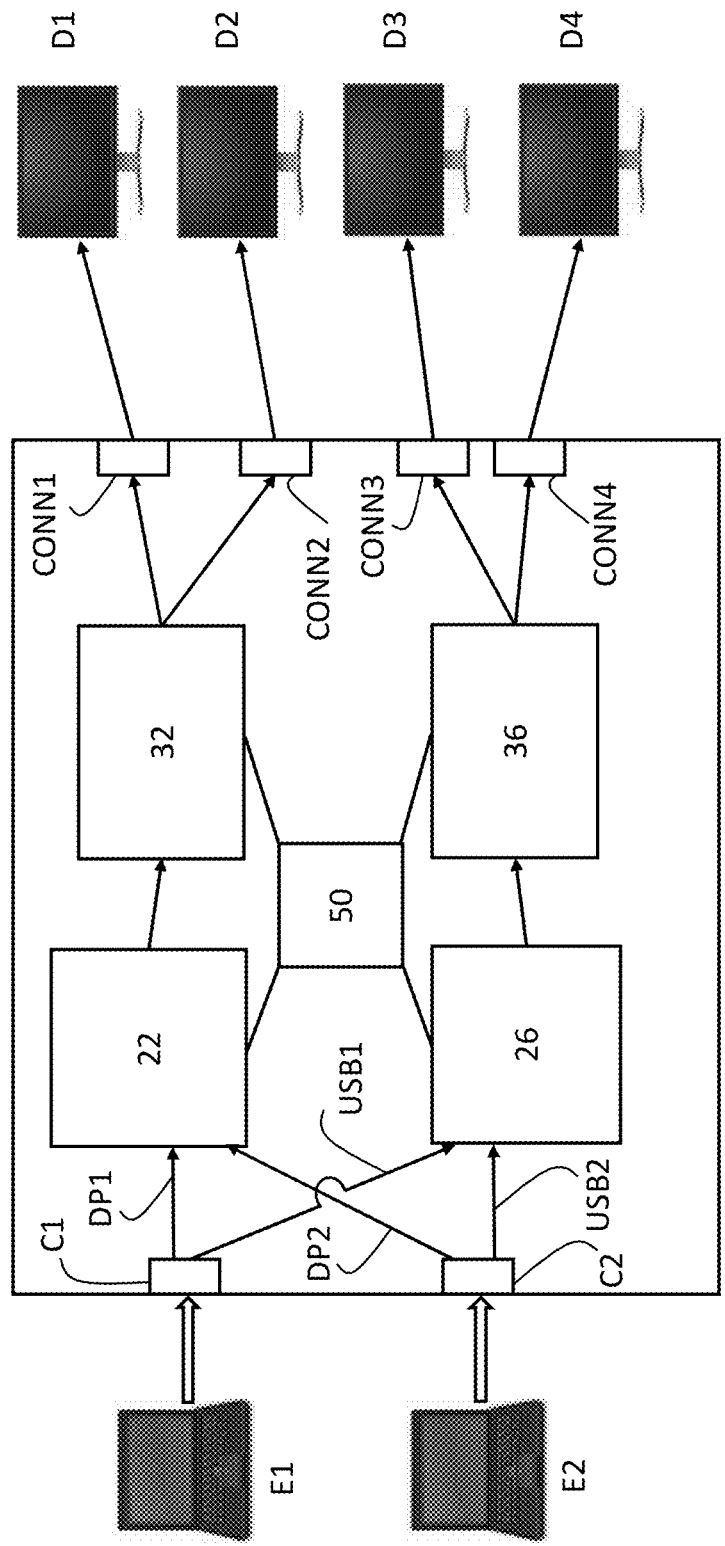
FIG. 1 is a schematic view of an apparatus for switching and converting video signals in accordance with a preferred embodiment of the present invention.

To more clearly describe apparatus and method for switching and converting video signals according to the present invention, embodiments of the present invention will be described in detail with reference to the attached drawings hereinafter.

With reference to FIG. 1 for a schematic view of an apparatus for switching and converting video signals in accordance with a first embodiment of the present invention, the apparatus of this embodiment is illustrated by two video data source devices and four video display devices.

In FIG. 1, the apparatus for switching and converting video signals comprises a connector C1, a connector C2, a multiplexer 22, a multiplexer 26, a DisplayPort image conversion module 32, a USB image conversion module 36, a control unit 50, a video connector CONN1, a video connector CONN2, a video connector CONN3 and a video connector CONN4.

The connector C1 is electrically coupled to the multiplexer 22 and the multiplexer 26. The connector C2 is electrically coupled to the multiplexer 22 and the multiplexer. The DisplayPort image conversion module 32 is electrically coupled to the multiplexer 22, the control unit 50, the video connector CONN1 and the video connector CONN2. The DisplayPort image conversion module 36 is electrically coupled to the multiplexer 26, the control unit 50, the video connector CONN3 and the video connector CONN4. The control unit 50 is electrically coupled to the multiplexer 22 and the multiplexer 26.

The two video data source devices include a first electronic device E1 and a second electronic device E2 which are electrically coupled to the video signal switching and conversion device 1 through the connectors C1, C2. Wherein, the first electronic device E1 and second electronic device E2 are video output devices such as laptops, desktops, tablet PCs, smart phones, servers, etc. However, the invention is not limited to the aforementioned electronic devices only.

The four video display devices include a first display device D1, a second display device D2, a third display device D3 and a fourth display device D4 respectively and electrically coupled to the video signal switching and conversion device 1 through the video connectors CONN1, CONN2, CONN3 and CONN4. The video connectors CONN1, CONN2, CONN3 and CONN4 may be connectors of DisplayPort, HDMI, or a combination of the above specifications, and the first display device D1, second display device D2, third display device D3 and fourth display device D4 are display devices with a specification corresponding to that of the video connectors CONN1, CONN2, CONN3 and CONN4, and these display devices may be LCD or LED display device. However, the present invention is not limited to the aforementioned display devices only.

The connector C1 and connector C2 are USB Type C connectors. In the present invention, the USB Type C connector is in compliance with the USB 3.1 specification and supports the DisplayPort Alternate Mode specification set by the Video Electronics Standard Association (VESA), so that a single USB Type C connector can transmit both DisplayPort and USB signals simultaneously.

Therefore, the first electronic device E1 can transmit DisplayPort video data DP1 and USB data USB1 to the video signal switching and conversion device 1 through different lanes of the connector C1; and the second electronic device E2 can transmit DisplayPort video data DP2 and USB data USB2 to the video signal switching and conversion device 1 through different lanes of the connector C2.

After the video signal switching and conversion device 1 receives the DisplayPort video data DP1 and USB data USB1 transmitted from the first electronic device E1 and the video signal switching and conversion device 1 receives the DisplayPort video data DP2 and USB data USB2 transmitted from the second electronic device E2, the DisplayPort video data DP1 of the first electronic device E1 and the DisplayPort video data DP2 of the second electronic device E2 are transmitted to the multiplexer 22 and used as input data, and the USB data USB1 of the first electronic device E1 and the USB data USB2 of the second electronic device E2 are transmitted to the multiplexer 26 and used as input data.

Wherein, the multiplexer 22 and multiplexer 26 are one-out-of-two multiplexers. In the present invention, the multiplexer may be a module with a routing function such as a data selector. However, the present invention is not limited to the aforementioned multiplexers only.

According to a user's selected switching, the control unit 50 controls the multiplexer 22 to select one of the video data from the two input video data for the output. Similarly, the multiplexer 26 is operated in the same way. In other words, the control unit 50 controls the multiplexer 22 to selectively output the DisplayPort video data DP1 of the first electronic device E1 or the DisplayPort video data DP2 of the second electronic device E2 to the DisplayPort image conversion module 32. The control unit 50 may control the multiplexer 26 to selectively output the USB data USB1 of the first electronic device E1 or the USB data USB2 of the second electronic device E2 to the USB image conversion module 36 according to the user's selected switching.

Wherein, the user may select the switching by a hardware switch, firmware, or software. However, the present invention is not limited to the aforementioned switching only.

After the DisplayPort image conversion module 32 receives the DisplayPort video data DP1 or DP2, the DP1 or DP2 are converted into DisplayPort or HDMI video data, and the converted DisplayPort or HDMI video data are transmitted to the corresponding video connectors CONN1 and CONN2 respectively. The video signal switching and conversion device 1 transmits the converted DisplayPort or HDMI video data to the first display device D1 and second display device D2 through the video connectors CONN1 and CONN2 for the screen display.

The USB image conversion module 36 converts the received USB data USB1 or USB2 into the DisplayPort or HDMI video data, and the converted DisplayPort or HDMI video data are transmitted to the corresponding video connectors CONN1 and CONN2 respectively. The video signal switching and conversion device 1 transmits the converted DisplayPort or HDMI video data to the third display device D3 and fourth display device D4 through the video connectors CONN1 and CONN2 respectively for the screen display.

Figure 2:
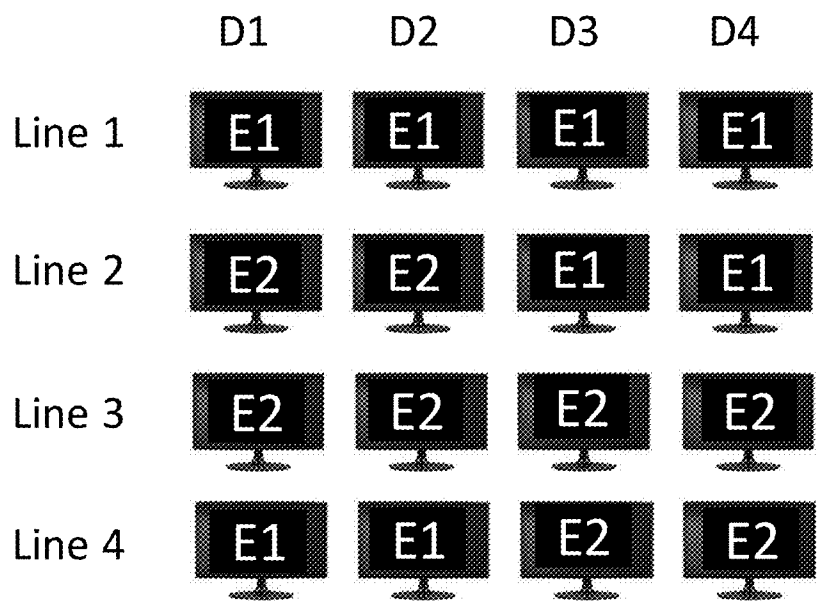

With reference to FIG. 2 for a schematic view of the screen display of a display device in accordance with the first embodiment of the present invention, the multiplexer 22 and the multiplexer 26 have a total of four input video data and output two video data, so that the two video data outputted by the multiplexer 22 and the multiplexer 26 have a total of four combinations: (1) DP1 and USB1; (2) DP1 and USB2; (3) DP2 and USB1; and (4) DP2 and USB2.

The second combination of the output video data (DP1 and USB2) is used as an example for illustrating the present invention. The DisplayPort image conversion module 32 converts the received DP1 into HDMI video data, and the video signal switching and conversion device 1 transmits the converted HDMI video data to the first display device D1 and second display device D2 through the corresponding HDMI connectors respectively for the screen display. After the DisplayPort image conversion module 36 converts the received USB2 into DisplayPort video data, the video signal switching and conversion device 1 transmits the converted DisplayPort video data to the third display device D3 and fourth display device D4 through the corresponding DisplayPort connectors respectively for the screen display. In Line 4 of FIG. 2, the first display device D1 and second display device D2 display the video data of the first electronic device E1, and the third display device D3 and fourth display device D4 display the video data of the second electronic device E2.

Similarly, in the first combination of output video data (DP1 and USB1) as shown in Line 2 of FIG. 2, the first display device D1 and second display device D2 display the video data of the first electronic device E1, and the third display device D3 and fourth display device D4 display the video data of the first electronic device E1. In the third combination of video data (DP2 and USB1) as shown in Line 2 of FIG. 2, the first display device D1 and second display device D2 display the video data of the second electronic device E2, and the third display device D3 and fourth display device D4 display the video data of the first electronic device E1. In the fourth combination of video data (DP2 and USB2) as shown in Line 3 of FIG. 2, the first display device D1 and second display device D2 display the video data of the second electronic device E2, and the third display device D3 and fourth display device D4 display the video data of the second electronic device E2.

With reference to FIG. 3 for a flowchart of a method for switching and converting video signals in accordance with the present invention, three video data source devices and eight video display devices adopted in the second embodiment are used as an example for illustrating the present invention.

In FIG. 3, the method for switching and converting video signal of this invention comprises the following steps:

S310: Receive N number of DisplayPort video data and N USB data through N number of USB Type C connectors respectively, wherein N is a natural number greater than or equal to 2. In the present invention, the USB Type C connectors are incompliance with the USB 3.1 specification and support the DisplayPort Alternate Mode specification set by Video Electronics Standard Association (VESA), so that a single USB Type C connector can transmit both DisplayPort and USB signals simultaneously.

In the second embodiment of the present invention, there are three video data source devices, so that the three video data source devices can receive three DisplayPort video data and three USB data through three USB Type C connectors.

S320: Select one of DisplayPort video data from N number of DisplayPort video data, and select one of the USB data from N number of USB. According to the user's selection, one of the DisplayPort video data is selected from the three received DisplayPort video data, and one of the USB data is selected from the three received USB data.

S330: Convert the selected DisplayPort video data and USB data into DisplayPort video data or HDMI video data.

In the second embodiment of the present invention second, the selected DisplayPort video data are converted into the first DisplayPort video data or the first HDMI video data, and the selected USB data are converted into the second DisplayPort video data or the second HDMI video data.

S340: Transmit the DisplayPort video data or HDMI video data to M number of display devices, wherein M is a natural number greater than or equal to 2.

In the second embodiment of the present invention, the first DisplayPort video data or first HDMI video data are transmitted to four display devices respectively, and the second DisplayPort video data or second HDMI video data are transmitted to the other four display devices. Finally, eight display devices may have nine combinations of displays.

The present invention has no particular limitation on the quantity of video data source devices and video display devices. In other embodiments, the invention may have three video data source devices and six video display devices, or four video data source devices and twelve video display devices, or any other combinations. Relatively, the multiplexer may be a one-out-of-three or one-out-of-four multiplex, and the present invention is not limited to the aforementioned types of multiplexers.

In an application of a USB Type C connector electrically coupled to a plurality of video source data devices, the video signal switching and conversion device of the invention allows a plurality of display device to selectively display the video data of a plurality of video source data device according to the user's selected switching. This application is intended for synchronous display, teaching, game, graphic design, store display, restaurant sign, and stock billboard and capable of improving the convenience of use and operation. The video signal switching and conversion device of the invention can convert the video data of a USB Type C device into DisplayPort/HDMI video data and outputs data from the respective display device. Obviously, the invention provides tremendous convenience to users.

The USB Type C input video signal is not limited to the DisplayPort signal only, but it can also be any other video signal such as HDMI, MHL, VGA, or DVI signals, etc.

The above description is made on embodiments of the present invention.

However, the embodiments are not intended to limit scope of the present invention, and all equivalent implementations or alterations within the spirit of the present invention still fall within the scope of the present invention.

What is claimed is:

1. An apparatus for switching and converting video signals comprising:
   N number of USB Type-C interfaces, being used for receiving N number of DisplayPort video signals from N number of video signal source devices, or optionally receiving N number of USB video signals from the N number of video signal source devices, wherein N is greater than or equal to 2;

a DisplayPort selector, being coupled to the N number of USB Type-C interfaces, for receiving the N number of DisplayPort video signals;
a USB selector, being coupled to the N number of USB Type-C interfaces, for receiving the N number of USB video signals;
a DisplayPort image conversion module, being coupled to the DisplayPort selector;
a USB image conversion module, being coupled to the USB selector;
a control unit, being coupled to the DisplayPort selector, the USB selector, the USB image conversion module, and the DisplayPort image conversion module;
N number of HDMI interfaces, being coupled to the DisplayPort image conversion module and the USB image conversion module; and
N number of DisplayPort interfaces, being coupled to the USB image conversion module and the DisplayPort image conversion module;
wherein the DisplayPort selector is controlled by the control unit so as to select one of the N number of DisplayPort video signals to be outputted, thereby transmitting the outputted DisplayPort video signal to the DisplayPort image conversion module;
wherein the DisplayPort image conversion module is controlled by the control unit, thereby directly transmitting the outputted DisplayPort video signal to one of the N number of DisplayPort interfaces, or converting the outputted DisplayPort video signal to one HDMI video signal and then subsequently transmitting the HDMI video signal to one of the N number of HDMI interfaces;
wherein the USB selector is controlled by the control unit so as to select one of the N number of USB video signals to be outputted, thereby transmitting the outputted USB video signal to the USB image conversion module;
wherein the USB image conversion module is controlled by the control unit, thereby converting the outputted USB video signal to one HDMI video signal and then subsequently transmitting the HDMI video signal to one of the N number of HDMI interfaces, or converting the outputted USB video signal to one DisplayPort video signal and then subsequently transmitting the DisplayPort video signal to one of the N number of DisplayPort interfaces.

2. The apparatus for switching and converting video signals according to claim 1, wherein each of the N number of USB Type-C interfaces has at least one first lane for transmitting the DisplayPort video signal and at least one second lane for transmitting the USB video signal.

3. The apparatus for switching and converting video signals according to claim 1, wherein the control unit is provided with a first controller and a second controller therein, wherein the first controller is configured for controlling the DisplayPort selector and the USB selector, and the second controller being configured for controlling the DisplayPort image conversion module and the USB image conversion module.

4. The apparatus for switching and converting video signals according to claim 1, wherein both the DisplayPort selector and the USB selector are selected from the group consisting of multiplexer and data selector.

* * * * *